(12) United States Patent
Roup

(10) Patent No.: US 9,840,037 B2
(45) Date of Patent: Dec. 12, 2017

(54) METHOD OF MAKING CONTINUOUS FOLDED AND CREASED WAISTBAND AND COLLAR STAND

(71) Applicant: Talon Technologies, Inc., Woodland Hills, CA (US)

(72) Inventor: Herman Sydney Roup, Santa Barbara, CA (US)

(73) Assignee: TALON TECHNOLOGIES, INC., Woodland Hills, CA (US)

( * ) Notice: Subject to any disclaimer, the term of this patent is extended or adjusted under 35 U.S.C. 154(b) by 589 days.

(21) Appl. No.: 14/497,308

(22) Filed: Sep. 25, 2014

(65) Prior Publication Data

US 2015/0113697 A1   Apr. 30, 2015

Related U.S. Application Data

(60) Provisional application No. 61/897,930, filed on Oct. 31, 2013.

(51) Int. Cl.
*A41D 27/06* (2006.01)
*A41D 27/24* (2006.01)
*B29C 53/36* (2006.01)
*A41F 9/02* (2006.01)

(52) U.S. Cl.
CPC .............. *B29C 53/36* (2013.01); *A41D 27/06* (2013.01); *A41D 27/245* (2013.01); *A41F 9/02* (2013.01); *B29C 2053/362* (2013.01); *B29C 2053/367* (2013.01)

(58) Field of Classification Search
None
See application file for complete search history.

(56) References Cited

U.S. PATENT DOCUMENTS

| 2,319,809 A | 5/1943 | Francis, Jr. |
| 2,573,773 A | 11/1951 | Rowe |
| 3,100,925 A | 8/1963 | Hubert |
| 3,290,209 A | 12/1966 | Ihrman |
| 3,382,552 A | 5/1968 | Davis et al. |
| 3,504,712 A | 4/1970 | Dusenbury et al. |

(Continued)

FOREIGN PATENT DOCUMENTS

| EP | 0945535 | 9/1999 |
| GB | 1408777 | 10/1975 |

(Continued)

OTHER PUBLICATIONS

PCT/US14/57890 filed on Sep. 26, 2014, Pending, Continuous Folded Waistbands, Collar Stands, and Methods and Systems for Making Same.
WIPO, PCT/US14/57890, International Search Report, dated Jan. 2, 2015.
WIPO, PCT/US14/57890, Written Opinion of the International Searching Authority, dated Jan. 2, 2015.
EPO Extended Search Report and Opinion for EP 14 858 495.6, dated Oct. 4, 2016 [6 pgs.].

(Continued)

*Primary Examiner* — Barbara J Musser
(74) *Attorney, Agent, or Firm* — Siritzky Law, PLLC

(57) ABSTRACT

A continuous stream of elements or parts of garments is formed by providing a continuous first substrate and optionally a continuous fusible substrate; positioning the continuous fusible substrate on the continuous first substrate to form a combination; fusing the combination to form a first fused combination; folding the first fused combination to form a folded fused combination; and then pressing the folded fused combination to form the continuous stream, wherein the continuous stream includes multiple individual elements or parts. The elements or parts may be collar stands or waistbands.

49 Claims, 21 Drawing Sheets

(56) References Cited

U.S. PATENT DOCUMENTS

| | | |
|---|---|---|
| 3,562,817 A | 2/1971 | Huddelston |
| 3,570,085 A | 3/1971 | Heinemann |
| 3,589,030 A | 6/1971 | Troope |
| 3,655,474 A | 4/1972 | Constantine |
| 3,723,217 A | 3/1973 | Bauer |
| 3,723,993 A | 4/1973 | Ruby |
| 3,822,335 A | 7/1974 | Cohen |
| 3,867,248 A | 2/1975 | Bauer |
| 4,007,835 A | 2/1977 | Klothe |
| 4,033,783 A | 7/1977 | Brodmann et al. |
| 4,051,215 A | 9/1977 | Tsuruta et al. |
| 5,987,721 A | 11/1999 | Morris |
| 2004/0019955 A1 | 2/2004 | Morris et al. |

FOREIGN PATENT DOCUMENTS

| | | |
|---|---|---|
| GB | 1445391 | 8/1976 |
| GB | 1 574 661 A | 9/1980 |

OTHER PUBLICATIONS

Chinese Patent Office (State Intellectual Property Office for People's Republic of China), First Office Action, dated May 27, 2017 for Chinese Patent Application No. CN 201480059583.3 (Chinese with English translation).

Chinese Patent Office (State Intellectual Property Office for People's Republic of China), Search Report, dated May 27, 2017 for Chinese Patent Application No. CN 201480059583.3 (Chinese with English translation).

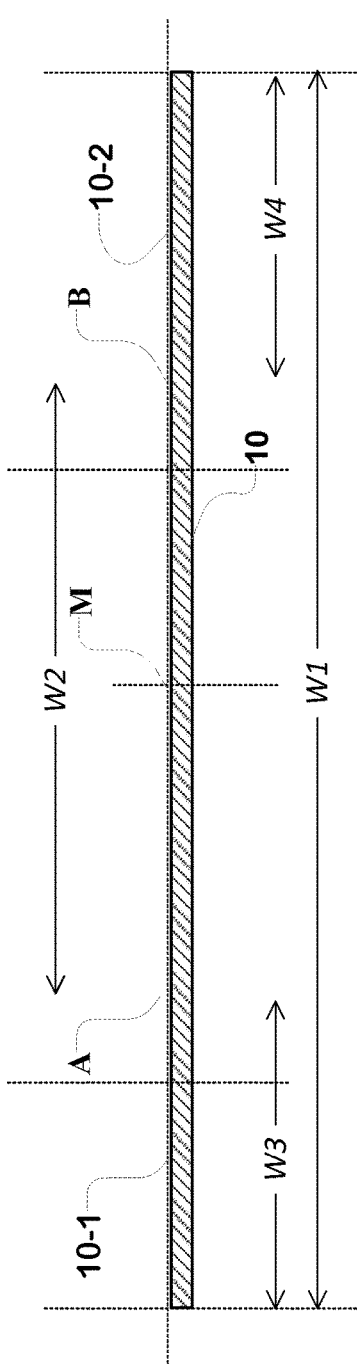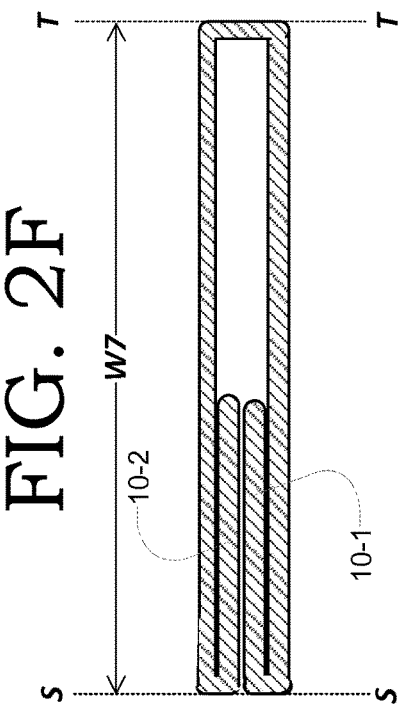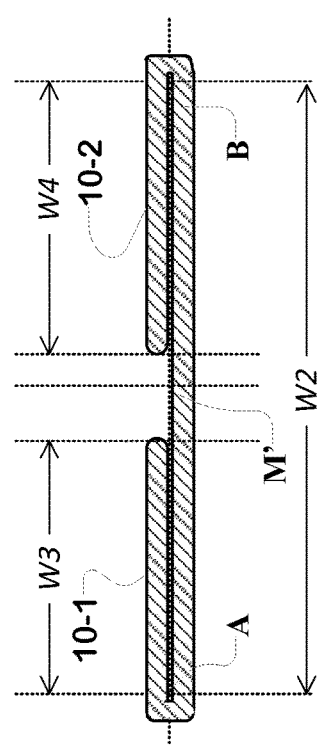

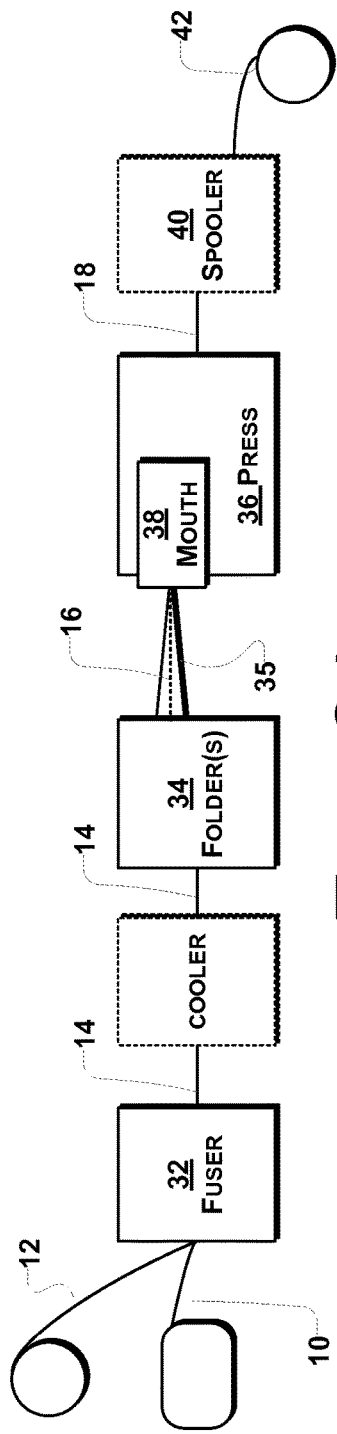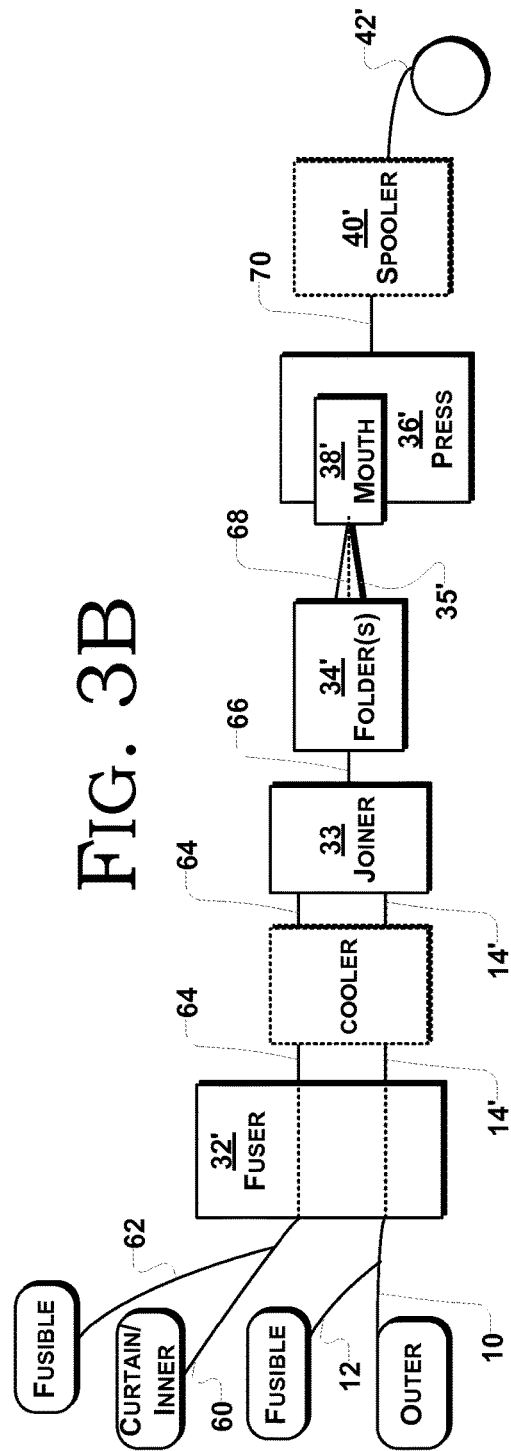

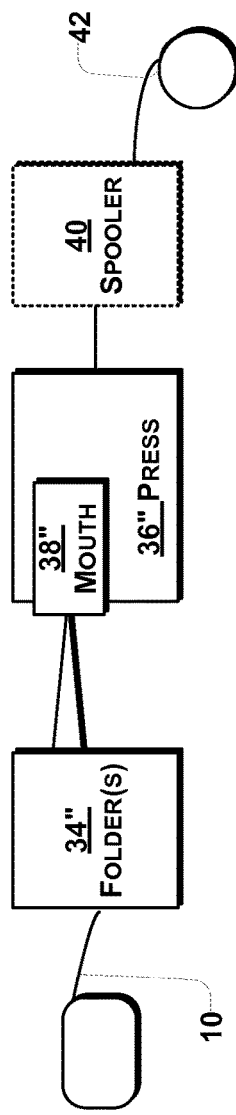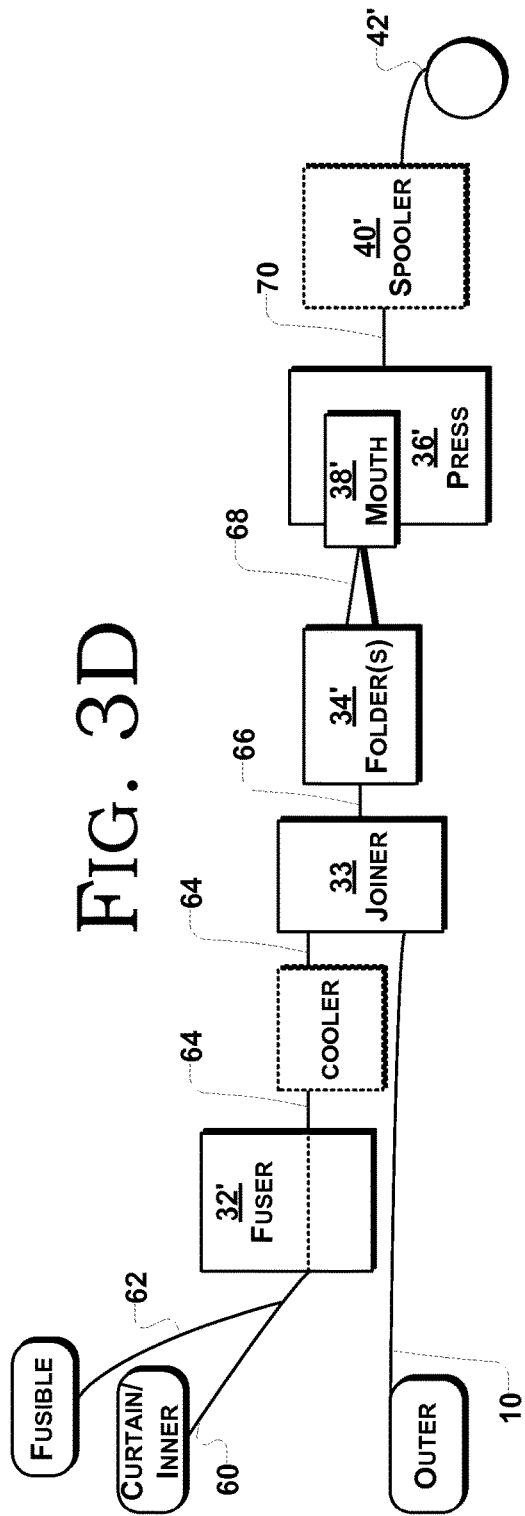
FIG. 3C
FIG. 3D

METHOD OF MAKING CONTINUOUS FOLDED AND CREASED WAISTBAND AND COLLAR STAND

RELATED APPLICATIONS

This application claims priority to U.S. Provisional Application No. 61/897,930, filed Oct. 31, 2013, the entire contents of which are hereby fully incorporated herein by reference for all purposes.

COPYRIGHT STATEMENT

This patent document contains material subject to copyright protection. The copyright owner has no objection to the reproduction of this patent document or any related materials in the files of the United States Patent and Trademark Office, but otherwise reserves all copyrights whatsoever.

BACKGROUND OF THE INVENTION

Field of the Invention

This invention relates to garment and garment manufacture, and, more particularly to waistbands and collar stands for garments and methods and devices for their manufacture.

Background and Overview

Many garments such as pants, dresses, skirts, and the like include waistbands, and shirt's use collar stands. There are many types of waistbands, including one-piece, waistbands with inners and waistbands with curtains. Traditionally, one-piece waistbands for use on garments were made by first cutting each waistband to the desired length, then folding the waistband across a central axis thereof to create a crease, and then pressing the crease down with a hand iron. The two edges were then each also folded in and pressed, and then, in some cases, the seams were sewn along the two outer edges. Then the one side was used to attach the waistband to the pant or skirt, the other side was tucked in and stitched down when closing the waistband.

This process was problematic in that often the creases were uneven and resulted in imperfect waistbands that may have frayed out and/or may not have aligned properly with the garment. Additionally, cutting each waistband individually, and then folding and pressing it increased the time taken to make each garment.

An object of this invention is to create waistbands and collar stands with consistent quality, and without wasting excess fabric, and in such a way that they can be efficiently attached to garments.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIGS. 2D-2F are side views of a substrate according to embodiments hereof;

FIGS. 3A-3D depict systems for manufacture of waistbands or collar stands according to embodiments hereof;

DETAILED DESCRIPTION OF THE PRESENTLY PREFERRED EXEMPLARY EMBODIMENTS

Figure 1A:
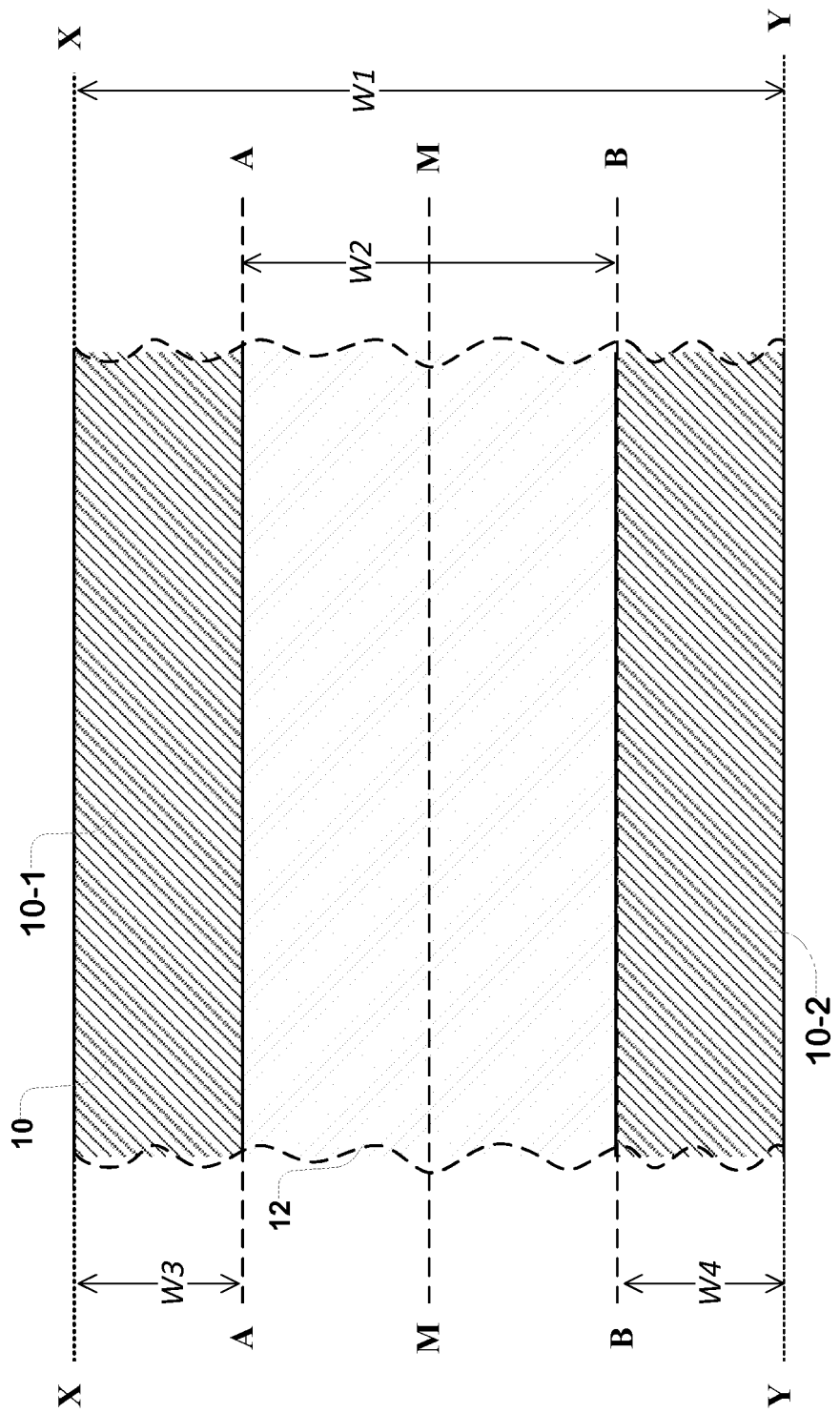
FIGS. 1A-1D are a top views of two substrates in various stages of forming waistbands or collar stands according to embodiments hereof.

Waistbands according to embodiments hereof are described with reference to FIGS. 1A to 1D and 2A, 2B-1, 2B-2, and 2C.

The following description refers to the manufacture of waistbands. It should be appreciated that the same processes and systems may be used for collar stands and other rectangular pieces.

In the following description a continuous waistband stream may be formed which may then be stored and then later cut to required lengths as needed. It should be appreciated that FIGS. 1A to 1D show a top view of only a portion of a continuous waistband.

A waistband stream is formed from two substrates or materials that are processed as described herein. The first substrate 10 is the outer material of the waistband to be manufactured. The first substrate 10 may be provided as a continuous piece of material (e.g., from a spool) or it may be formed by joining pre-cut waistbands together, end-to-end (thereby to form a continuous piece of material). The latter approach is preferable when color matching of waistbands to garment is desired, as the individual pre-cut waistbands can be cut from the same material as the rest of the garment. This latter approach lends itself to a system in which waistbands are processed in smaller batches (e.g., 10-20 at a time), although it can be used for larger batches. Although the process is described here using two substrates, it should be appreciated that a single substrate—a regular fabric—could be used alone, e.g., as shown in FIGS. 2D-2F. The first substrate may comprise rigid fabric, or stretch fabric, or fabric cut on the bias. In some cases the first substrate may comprise: denim, cotton, cotton blends, wool, wool blends, polyester, polyester blends, spandex, spandex blends, polyester viscose, linen and linen blends.

The fusible substrate 12 is a fusible material that is applied to the inside of the waistband. The term "fusible" is sometimes used herein to refer to the fusible material. It should be appreciated that the words "first" and "second" are used herein to distinguish or identify the materials or substrates, and not to show a serial or numerical limitation.

Preferably the inner material of second substrate 12 comprises a fusible substrate and is provided, in part, to provide and/or maintain an elastic memory of the form and the shape of the waistband.

For example, if the waistbands are to be made from denim, then the outer material or first substrate 10 will comprise denim, and the inner material or fusible substrate 12 will be an appropriate material that will fuse to the denim under appropriate fusing conditions (i.e., pressure, speed, and temperature conditions). It should be appreciated that the waistbands manufactured by the processes described herein may use any materials, and invention is not limited by any examples given. It should further be appreciated that those of ordinary skill in the art of garment manufacturing will know and understand, upon reading this description, which materials can be used together and what the fusing requirements are for various combinations of first and second substrates.

In order to manufacture a continuous waistband according to embodiments hereof, and as shown, e.g., in FIG. 1A, the fusible substrate 12 is positioned on top of the first substrate 10. As shown in the drawing in FIG. 1A, the first substrate 10, before being folded, has a width W1, and the fusible substrate 12 has a width W2.

Various dashed and dotted lines are used in FIGS. 1A to 1C and 2A, 2B-1, 2B-2, and 2C to aid in this description. It should be appreciated that these lines are merely descriptive aids.

Thus, as shown in FIG. 1A, the fusible substrate 12 is positioned between dashed lines A-A and B-B, preferably centered along the dashed line M-M that denotes a center axis of the first substrate 10.

It should be appreciated, however, that the fusible substrate 12 may be positioned off-center with respect to the first substrate 10 for certain waistband designs, and that these designs are contemplated herein.

For the purposes of this discussion, the distance from the edge of the fusible substrate along line A-A to the edge X-X of first substrate 10 is referred to as W3, and distance from the edge of the fusible substrate along the line B-B to the edge Y-Y of first substrate 10 is referred to as W4.

The fusible substrate 12 may be positioned substantially in the center of the first substrate 10 (i.e., substantially along a central axis of the first substrate 10), or it may be positioned off center. In other words, the values of W3 and W4 may by substantially equal (when the fusible 12 is centered along the transverse axis of the first substrate 10, or they may be unequal (when the fusible 12 is off center), as shown, e.g., in FIG. 1D. In some cases the fusible 12 may be positioned so that there is no substrate 10 exposed on one or both sides. For example, the fusible 12 may be positioned on the substrate 10 with only ⅛ inch of the edge on one side.

Those of ordinary skill in the art of garment manufacturing will know and the dimensions needed for various types and styles of waistbands or collar stands.

In FIG. 1A the dashed lines A-A and B-B denote two fold lines. In the drawings these lines are shown on the edges of the fusible 12.

As will be explained below, in forming a continuous waistband according to embodiments hereof, a portion 10-1 of the first substrate 10 is folded over the fold line A-A, and a second portion 10-2 the first substrate 10 is folded over the fold line B-B. The distance between the fold lines A-A and B-B is essentially the width of the fusible 12. The width of the first portion of the first substrate 10 that will be folded over the fold line A-A is substantially W3, and the width of the portion of the second portion of the first substrate 10 that will be folded over the fold line B-B is substantially W4.

As shown in the drawings, the fold line A-A corresponds substantially to an edge A-A of the fusible substrate 12. It should be appreciated that in less preferred embodiments the fold line A-A may be away from the edge of the fusible substrate 12. Similarly, while the other fold line is shown to correspond substantially to the edge B-B of the fusible substrate 12, in some less preferred embodiments the other fold line B-B may be away from the edge of the fusible substrate 12.

Figure 2A:
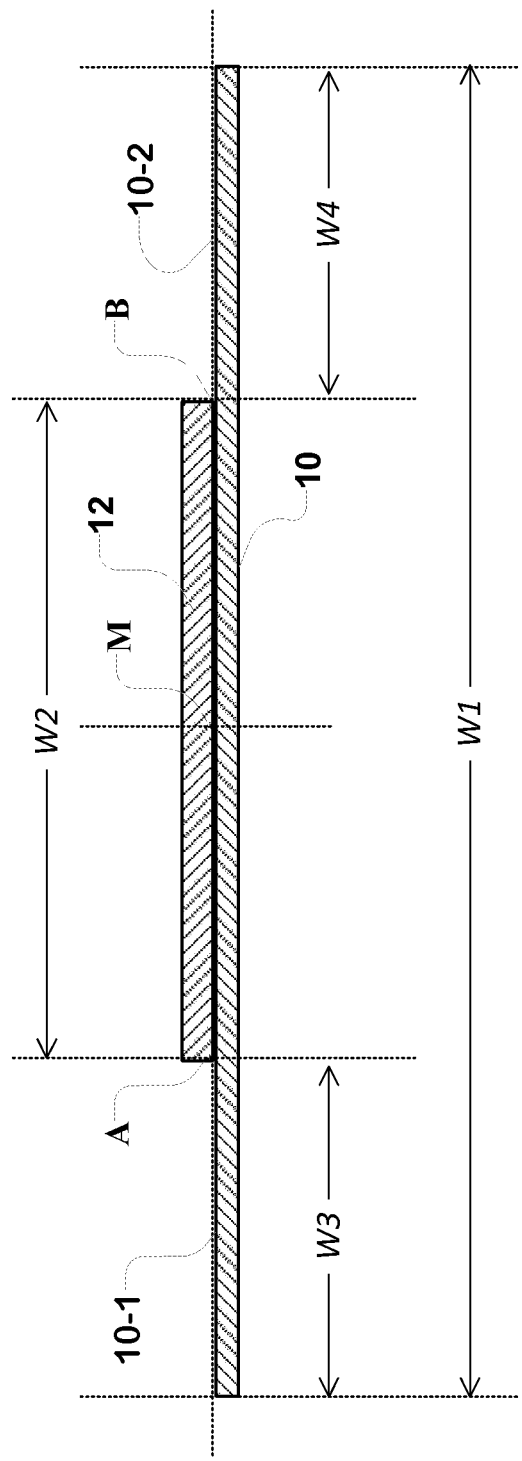
FIGS. 2A, 2B, and 2C are side views of the substrates of FIGS. 1A-1C, respectively, according to embodiments hereof.

FIG. 2A shows a cross-sectional view of the materials in FIG. 1A, with the fusible substrate 12 positioned on top of the first substrate 10.

Figure 1B:
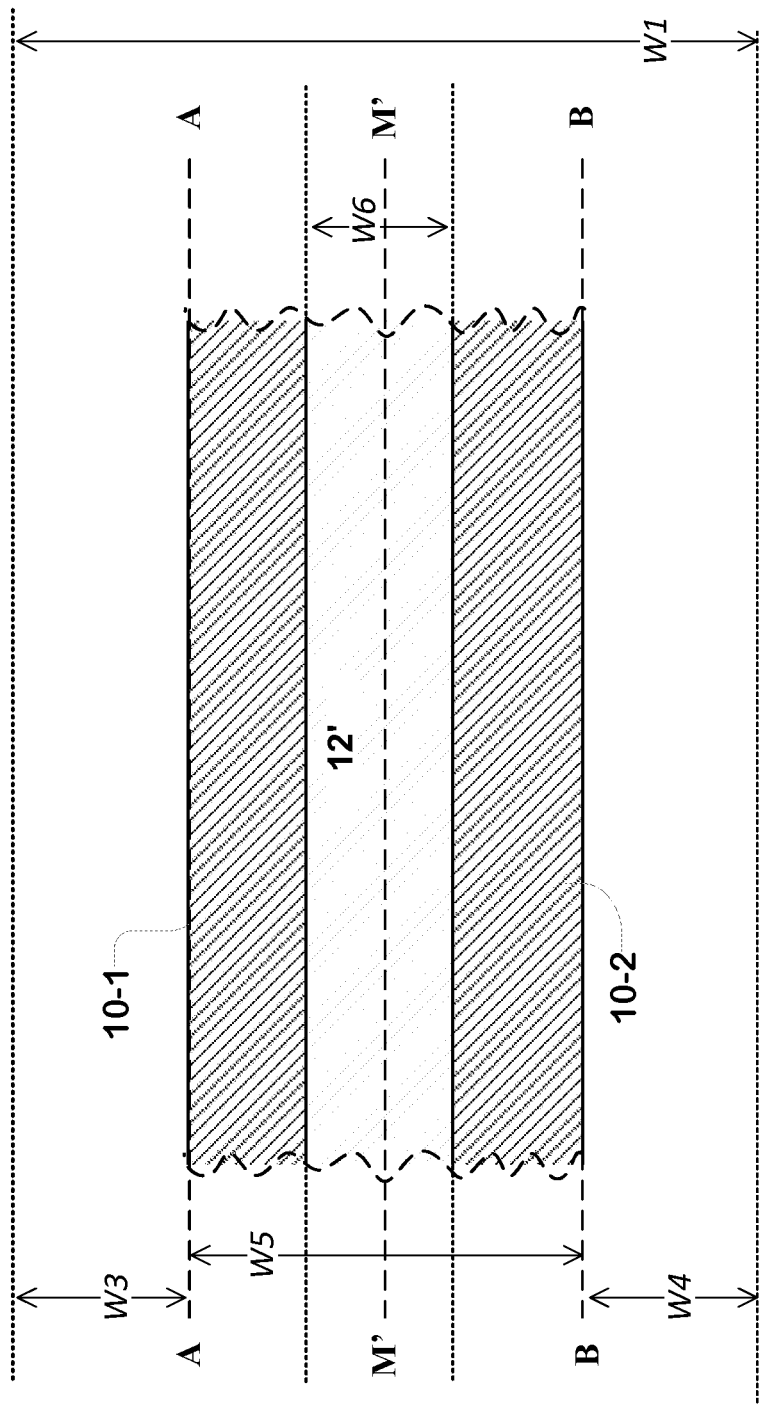
Figure 2B:
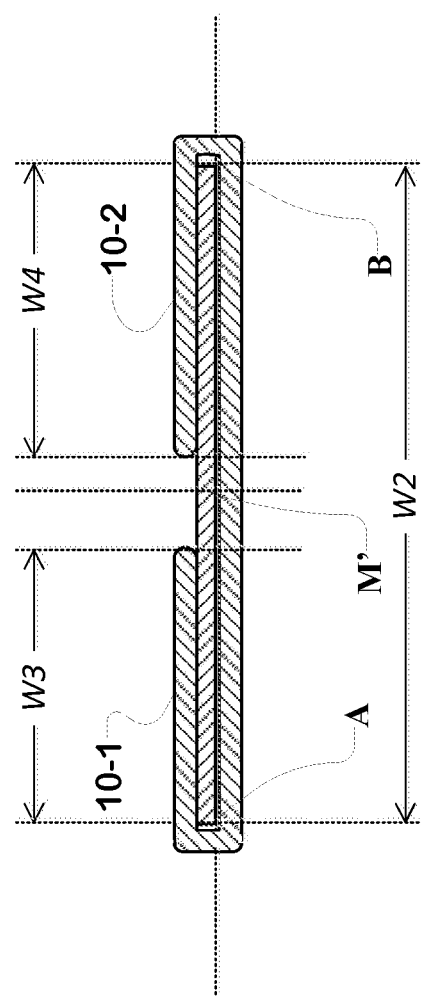

FIGS. 1B and 2B show a continuous waistband being formed according to embodiments hereof, and in which a first portion 10-1 of the first substrate 10 has been folded over fold line A-A, and a second portion 10-2 of the first substrate 10 has been folded over fold line B-B.

FIG. 2B shows an exemplary cross-sectional view of the continuous waistband being formed in FIG. 1B. In the exemplary embodiment in FIG. 2B the fold line A-A corresponds substantially to a first edge of the fusible substrate 12, and the fold line B-B corresponds substantially to a second edge of the fusible substrate 12.

After the first and second side portions 10-1 and 10-2 of the first substrate 10 have been folded over fold lines A-A and B-B, respectively, a portion 12' of the fusible substrate 12 may remain uncovered.

It should be appreciated that the center fold line M'-M' in FIG. 1B may not correspond to the center line M-M in FIG. 1A, depending on the symmetry of the fold lines A-A and B-B with respect to the line M-M, and the distances W3 and W4.

Figure 1C:
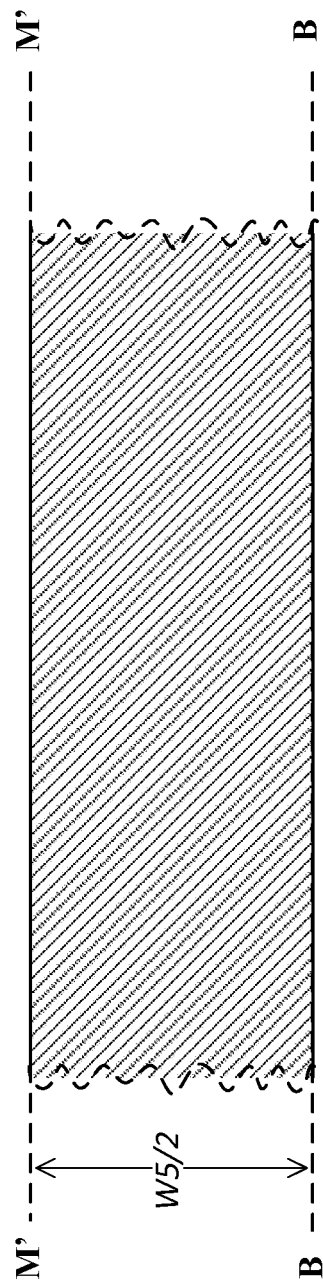
Figure 1D:
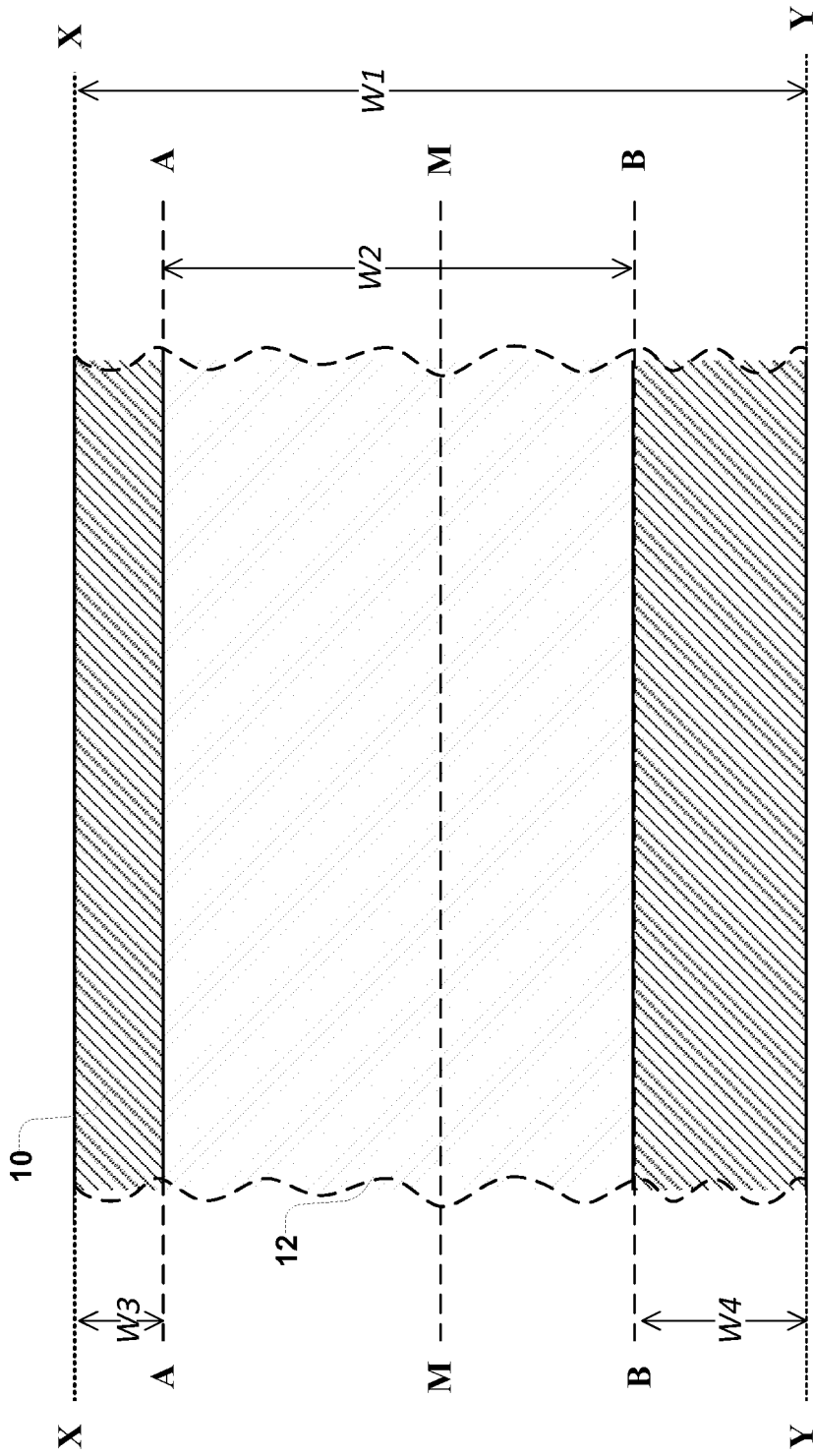

FIG. 1C shows a continuous waistband formed when the materials shown in FIG. 1B are folded substantially over the fold line M'-M', which is preferably a centerline of the combined substrates after the two side portions have been folded over the fold lines A-A and B-B.

Figure 2C:
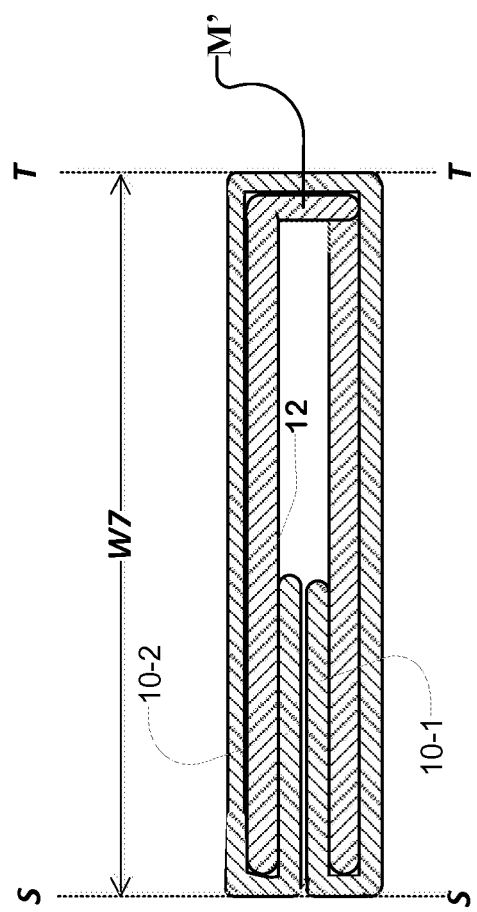

FIG. 2C shows a cross-sectional view of the waistband being formed after the folds shown in FIG. 1C. It should be appreciated that, as with all of the drawings herein, FIG. 2C is not drawn to scale and that relative positions and sizes of the substrates are merely exemplary. It should be appreciated that, in addition to the drawings not being to scale, the folds of actual substrates or materials will not be rectangular, and the rectangular folding is shown in the drawings to aid in this description.

As shown in FIG. 2C, the substrates of FIG. 1B and FIG. 2B are folded over a substantially central fold line M'-M' to form a folded waistband having width W7. Those of ordinary skill in the art will appreciate and understand, upon reading this description, how to select various fold widths in order to achieve a waistband having a width W7. As noted above, the thickness and type of each of the substrates will determine the thickness of the folds and how much material needs to be included in each substrate to accommodate the various folds. Similarly, those of ordinary skill in the art will appreciate and understand, upon reading this description, how large each folded portion of the first substrate 10 needs to be in order to sufficiently overlap fusible substrate 12 when the first and second side portions of the first substrate 10 are folded over fold lines A-A and B-B, respectively.

The fusible substrate 12 may comprise adhesive or the like so that it may be fused with the first substrate 10 under appropriate fusing conditions. In some embodiments the fusible substrate 12 has less adhesive or fiber or fabric yarns along the fold line M'-M' in order to aid with the folding.

Figure 6A:
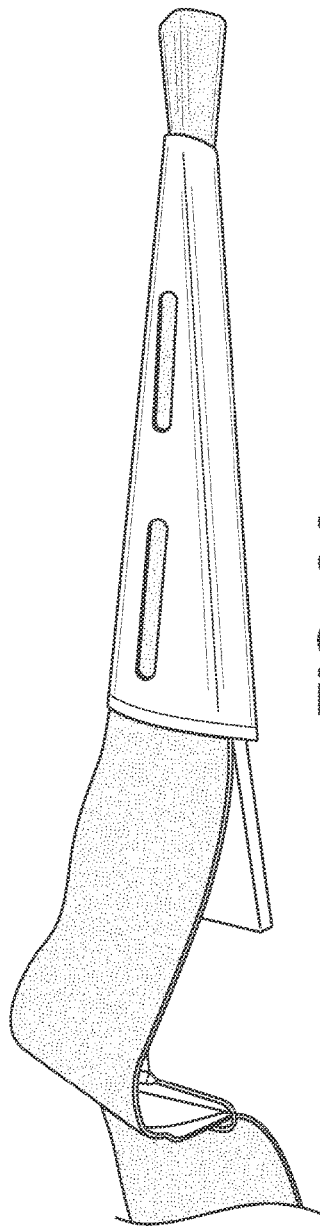
FIGS. 6A-6N depict an exemplary folder for manufacture of waistbands or collar stands according to embodiments hereof.
Figure 6B:
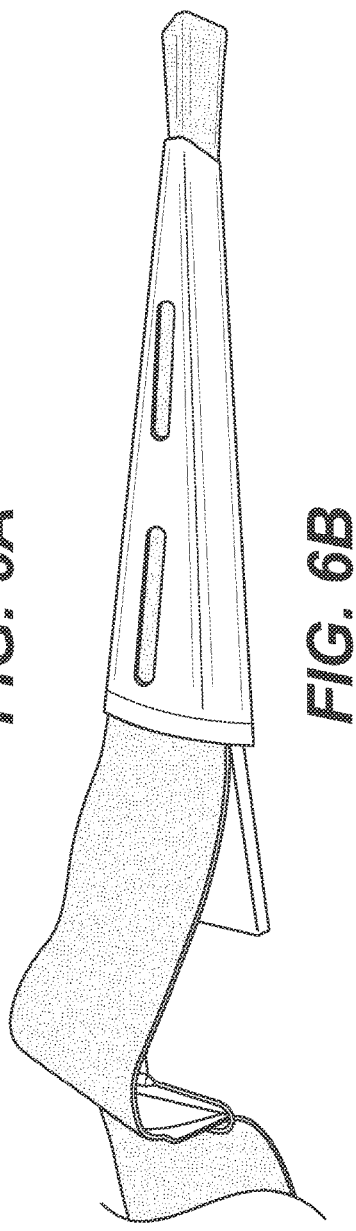
Figure 6C:
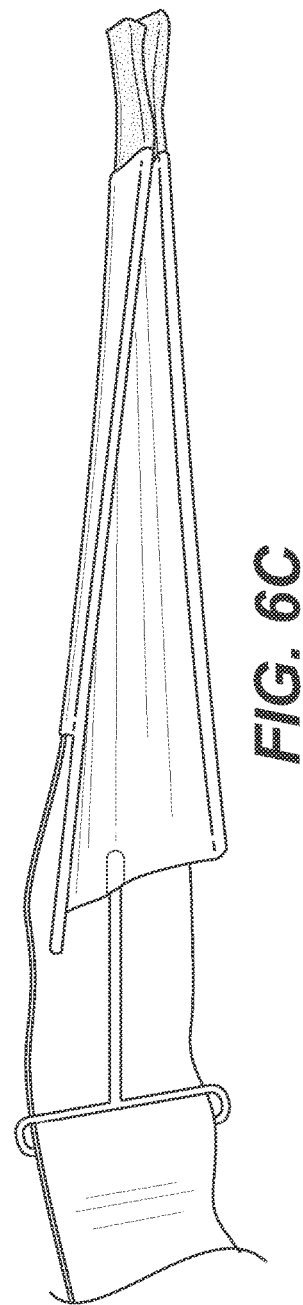
Figure 6D:
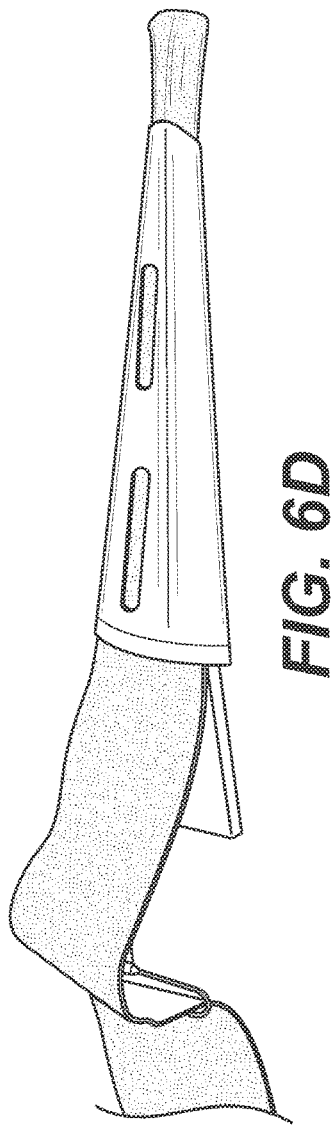
Figure 6E:
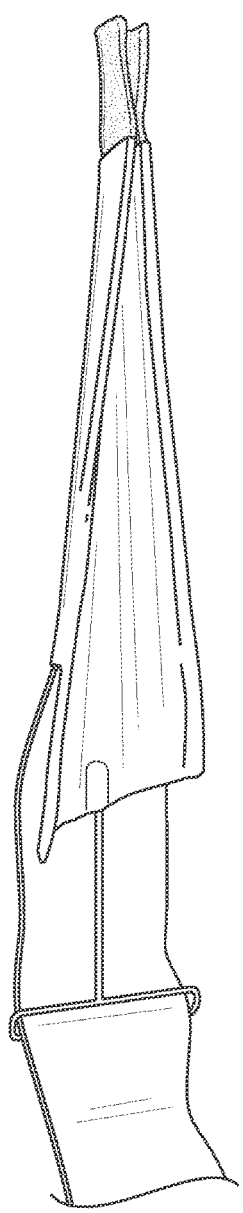
Figure 6F:
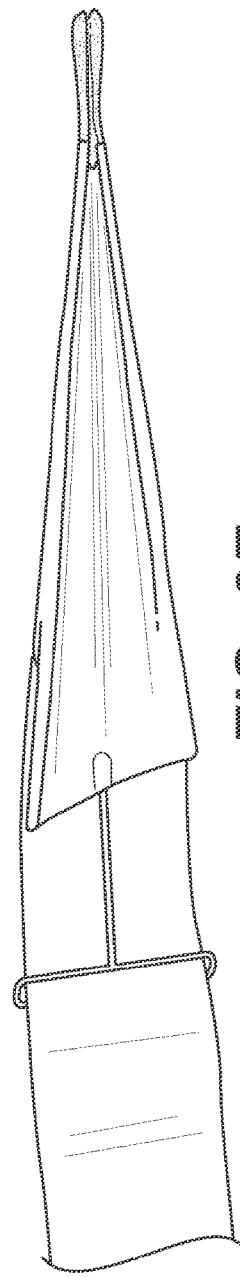
Figure 6G:
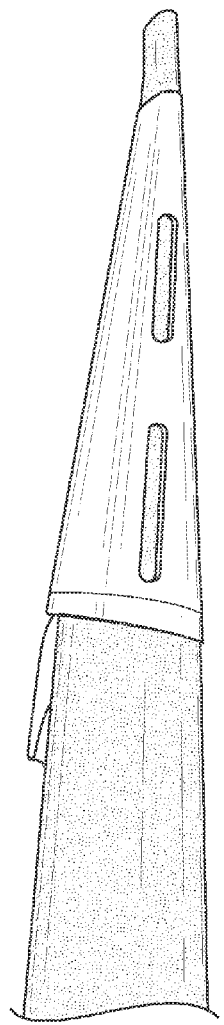
Figure 6H:
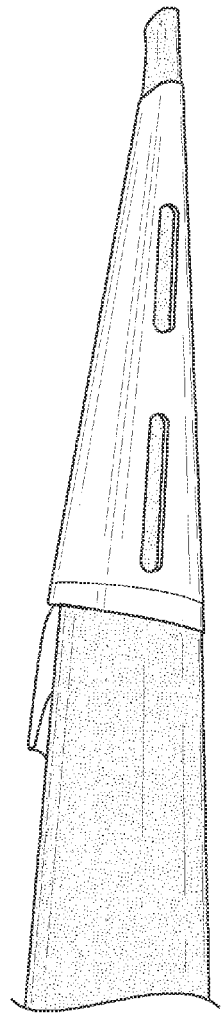
Figure 6I:
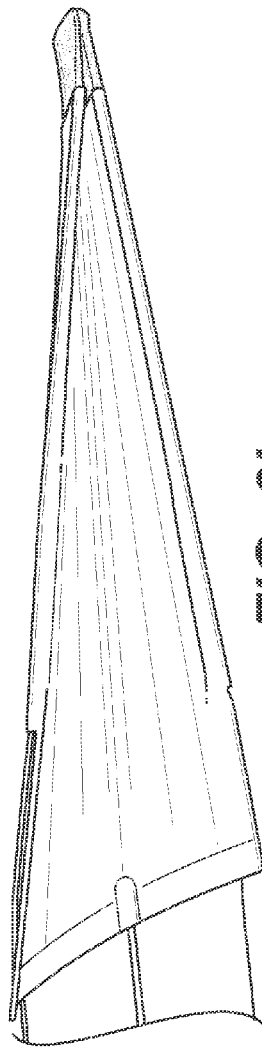
Figure 6L:
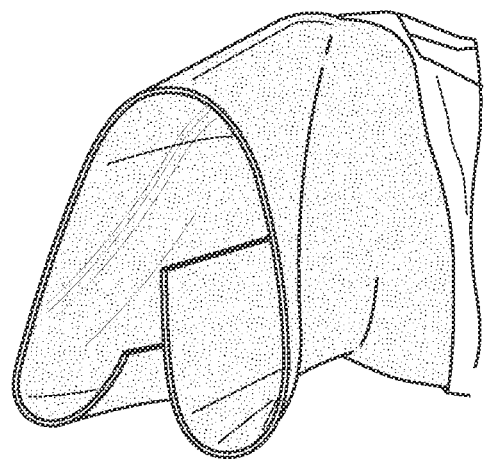
Figure 6K:
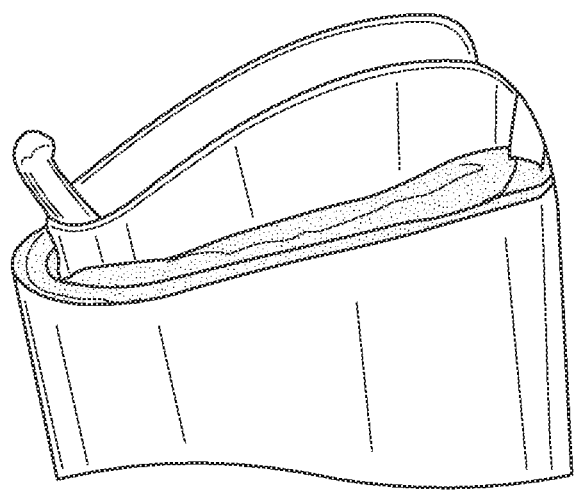
Figure 6J:
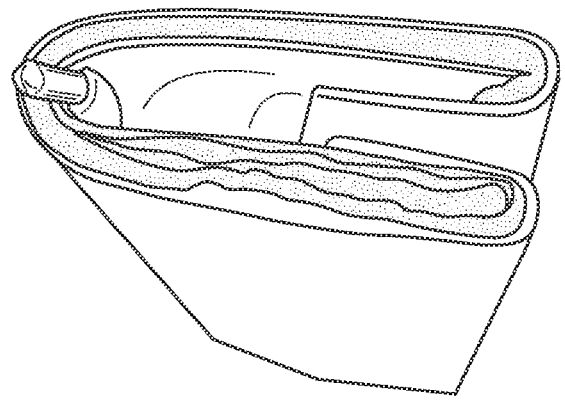
Figure 6M:
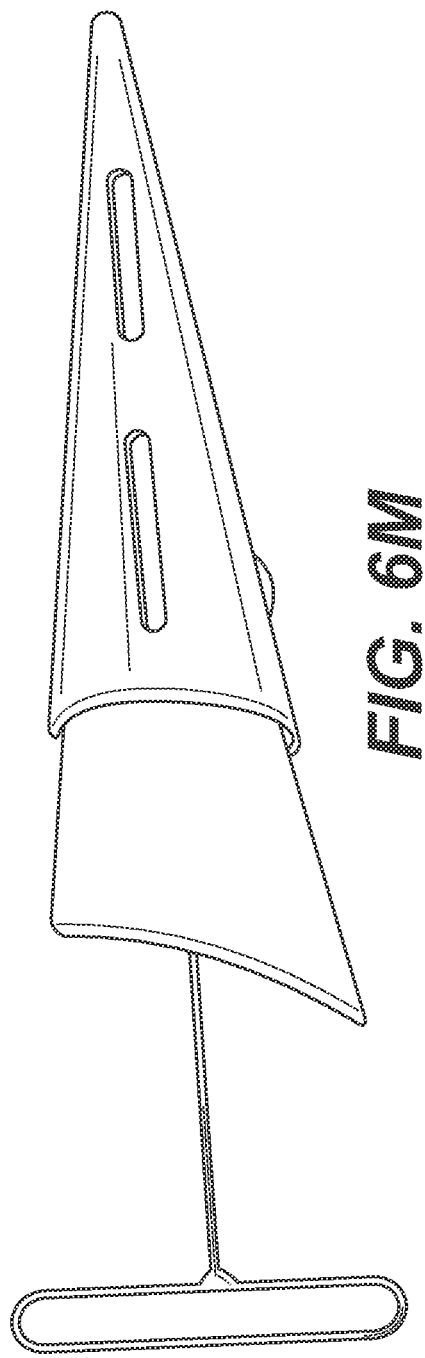
Figure 6N:
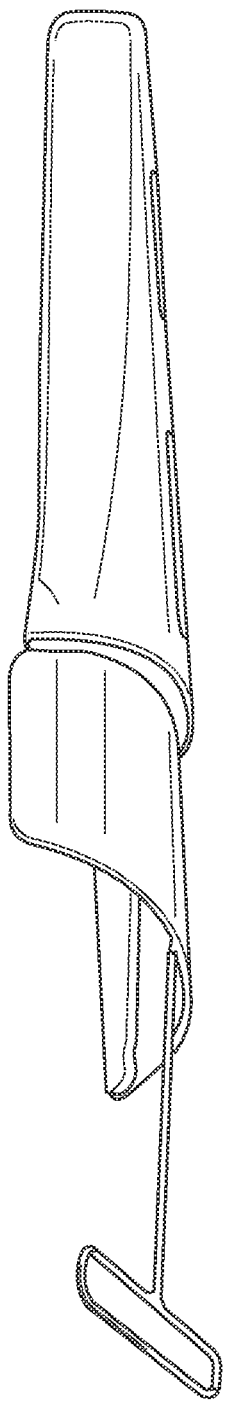

Although the folding of the first substrate 10 and the fusible substrate 12 is shown in three distinct drawings (FIGS. 1A-1C, and corresponding FIGS. 2A-2C), it should be appreciated that the folds may be achieved simultaneously, e.g., using a folder shown in FIGS. 6A-6N).

FIG. 3A depicts an exemplary system 30 for manufacture of continuous waistbands according to embodiments hereof.

Figure 7A:
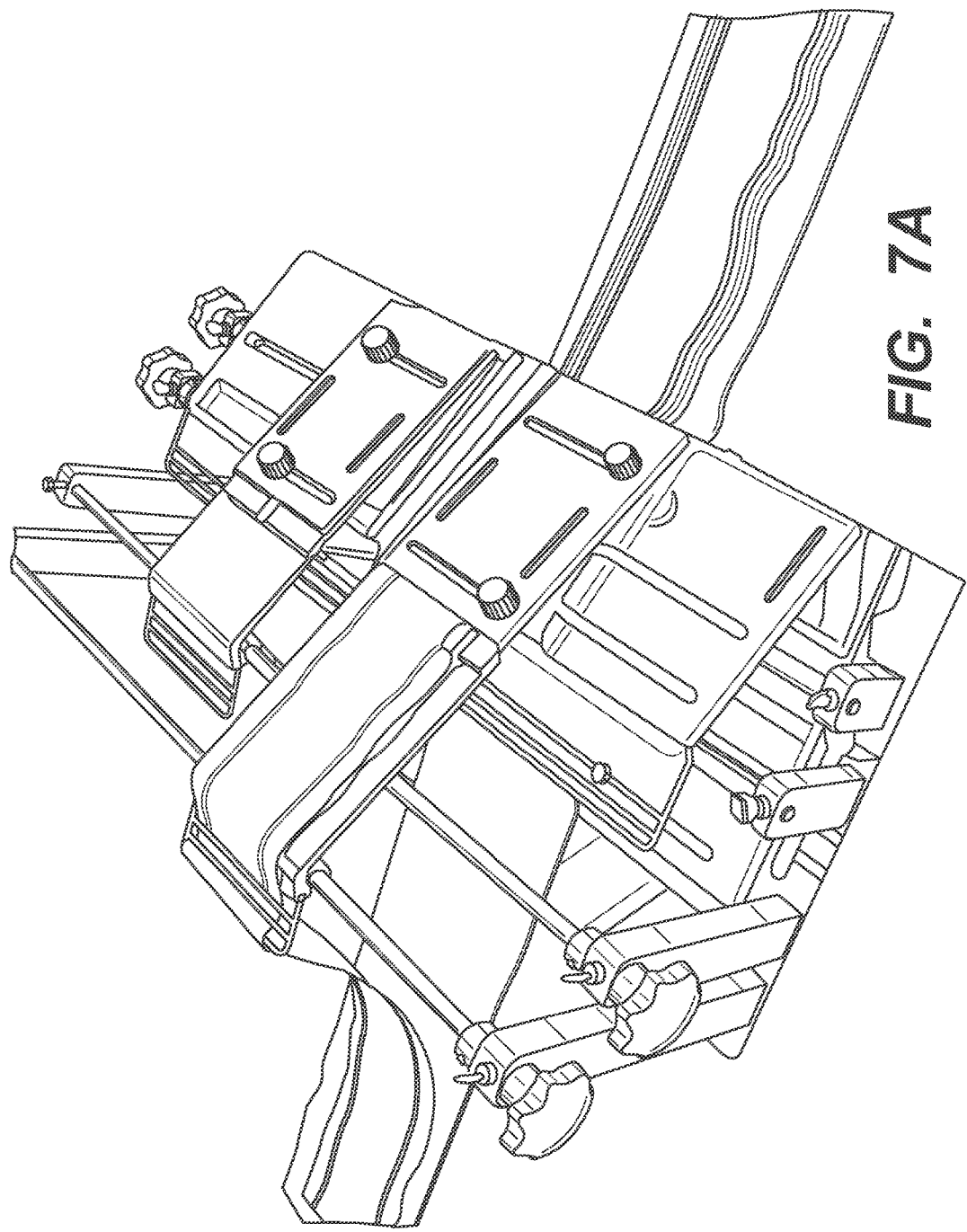
FIGS. 7A-7C depict exemplary guides used in the systems of FIGS. 3A-3B.
Figure 7B:
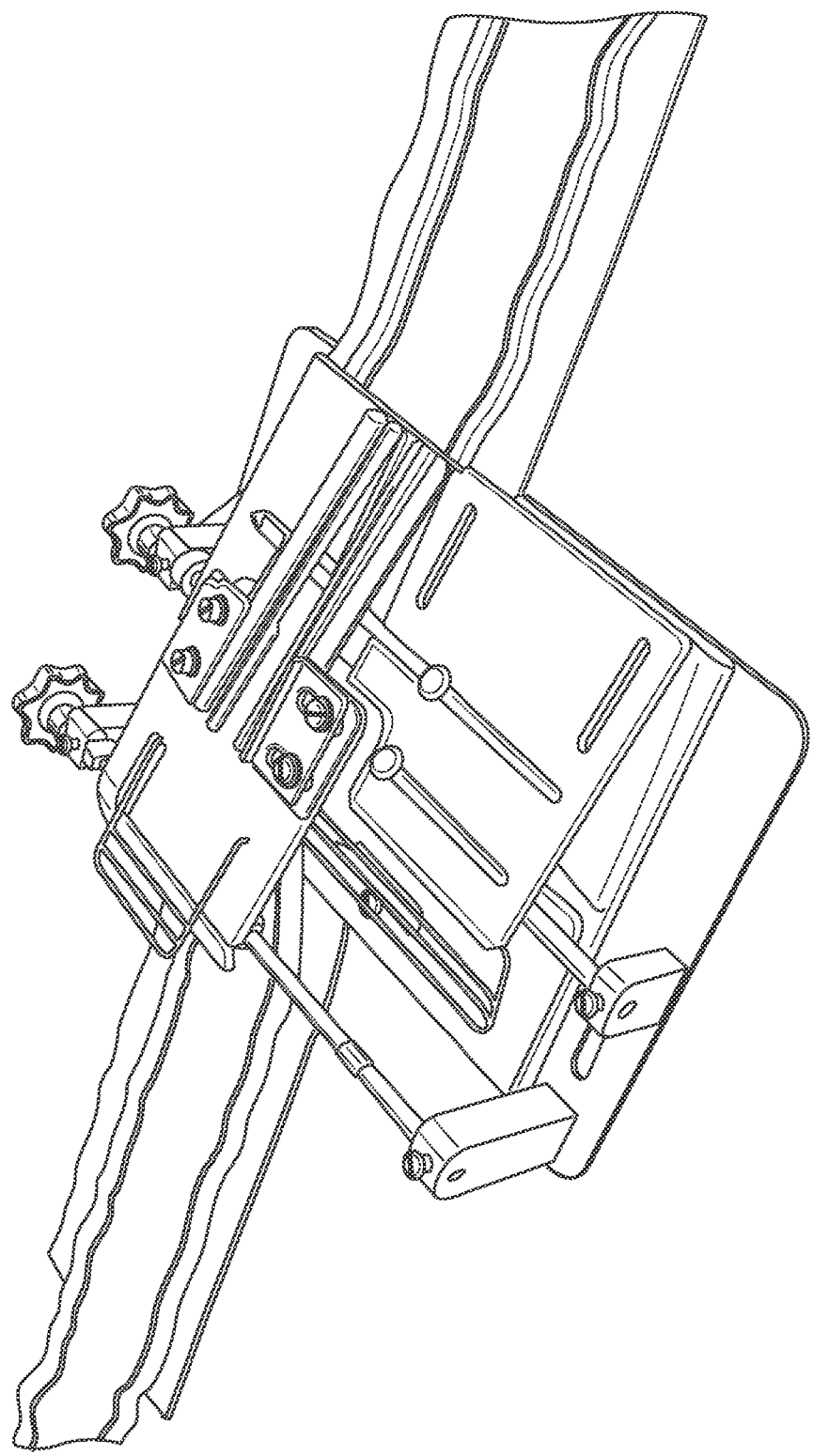
Figure 7C:
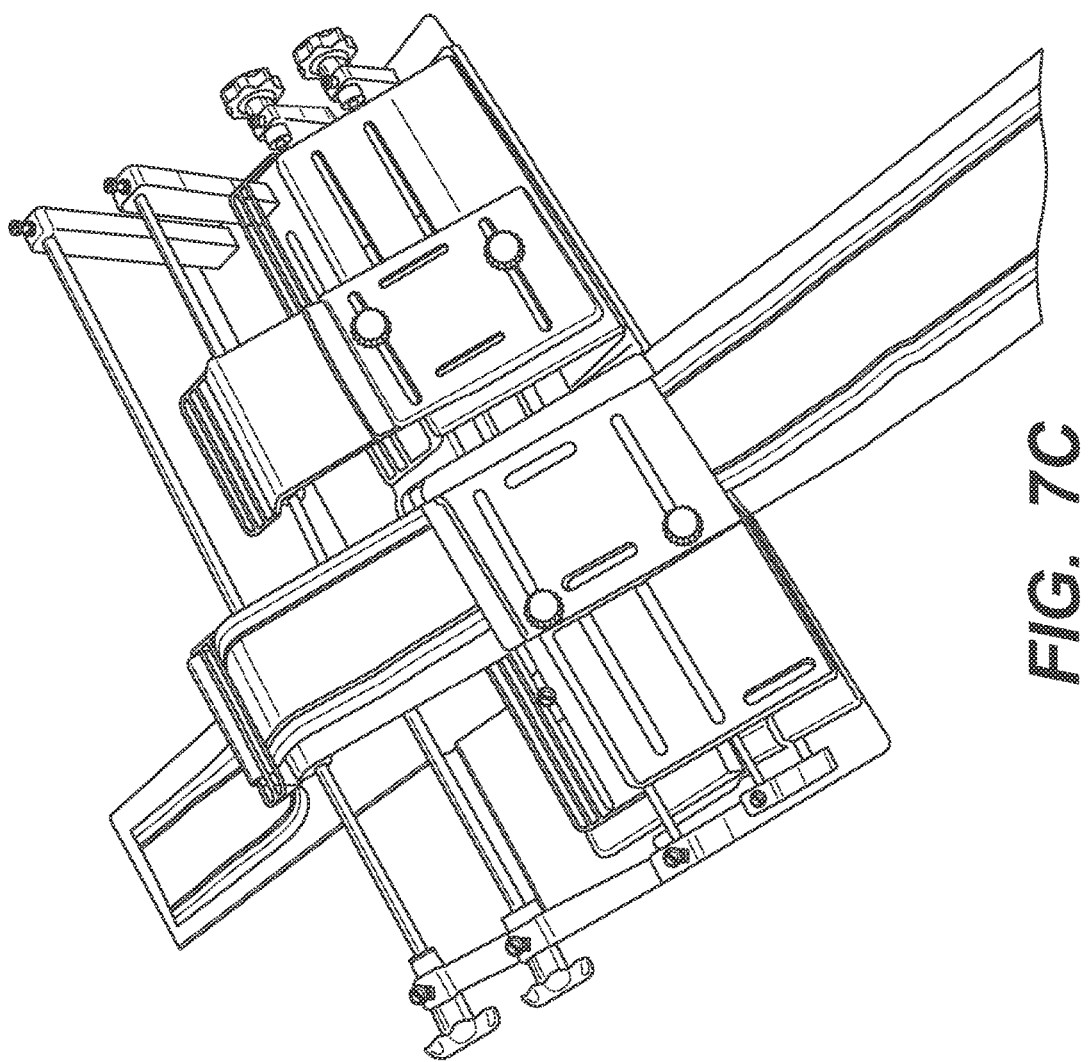

As shown in the drawing in FIG. 3A, fusible substrate 10 and first substrate 12 are fed into a fuser (or fusing press) 32. Before entry to the fuser 32, the fusible substrate 12 is positioned on top of the first substrate 10 as shown, e.g., in FIGS. 1A and 2A. A guide mechanism (e.g., as shown in FIGS. 7A-7C) may be positioned in front of fusing press 32 in order to position the fusible substrate 12 on the first substrate 10 exactly where needed The first substrate 10 and the fusible substrate 12 may be provided on spools or troughs or the like which are positioned to feed appropriate amounts of the substrates 10 and 12 into the fuser 32 substantially tension free. The spools may be positioned such that the fusible substrate 12 is appropriately located on top of the first substrate 10.

The fuser 32 fuses the first and second substrates together under conditions (e.g., at temperature, pressure, and speed) appropriate for the materials being used. Those of ordinary skill in the art will know and understand what settings to use for the fuser 32 based on the materials being used for the first substrate 10 and the fusible substrate 12. The output of the fuser 32 is a fused combination 14 of the first substrate 10 and the fusible substrate 12, e.g., as shown in FIGS. 1A and 2A.

The output 14 of fuser 32 is preferably cooled (e.g., in troughs or by spacing between equipment components) and then provided to one or more folders 34 in order to achieve the folds, e.g., as described above with reference to FIGS. 1A to 1C and 2A, 2B, and 2C (over fold lines A-A, B-B, and M'-M'). The folds may be achieved simultaneously with a single folder that folds the two side portions first and then does the fold over the M'-M' line (e.g., as shown in FIGS. 6A-6N). It should be appreciated, however, that the folds may be achieved with two or three distinct folding mechanisms (which collectively form folder(s) 34). In some cases only one or two folds may be needed, in which case an appropriate folder mechanism will be used.

The output 16 of folder(s) 34 is the continuous waistband shown in FIGS. 1C and 2C. This output 16 is fed into a second fuser (fusing press) 36 (denoted "Press" in the drawing) pressing/creasing the folded fused materials (first substrate 10 fused with fusible substrate 12). Press 36 presses the folded substrates to help production of a continuous folded and/or creased waistband. As the press 36 does not need to fuse the substrates, it may operate at a lower temperature than fuser 32. The waistband 18 produced by press 36 may then be collected, for example, by a spooler 40 onto spools 42 or may be cut to measurement.

The spooled continuous waistband 18 may then be cut to appropriate length for use on a garment.

Fuser 32 may be a Reliant M60 (made by Reliant Machinery Ltd., United Kingdom) or the like, and press 36 may be a Reliant M45 or the like.

It should be appreciated that the output 14 of the fuser 32 may be hot and should therefore preferably be cooled before being fed into folder(s) 34. Cooling bins or the like may be provided in order to cool the fused output 14.

The output 16 of folder(s) 34 is a folded, fused substrate to be fed into the press 36. In order to prevent the output 16 of the folder(s) 34 from unfolding before being pressed, the folder 34 preferably feeds directly into the mouth 38 of the press 36, with little or no gap between them. In order to achieve this, the folder preferably has an extended output portion (35 in FIG. 3A, 35' in FIG. 3B, and as shown, e.g., in FIGS. 6A-6N) that can feed directly (or substantially directly) into the mouth 38 of press 36. In one example, as shown in FIGS. 6A-6N, a portion 34, 34' of the folder 34 extends 8-10 inches (which may be referred to herein as a Roup extension). It should be appreciated that a Roup extension may be shorter than 8 inches or longer than 10 inches. In some embodiments one or more standalone folders may be used with a separate flat guide (e.g., 8-10 inches long) in front of it to feed the output of the folder(s) directly into the mouth of the press. The flat guide should control the output of the folder to prevent it from unfolding. The extended output portion 35, 35' of the folder(s) 34, 34' may be fully or partially integrated into and be part of the folders(s) 34, 34' or it may be a separate component.

Figure 4A:
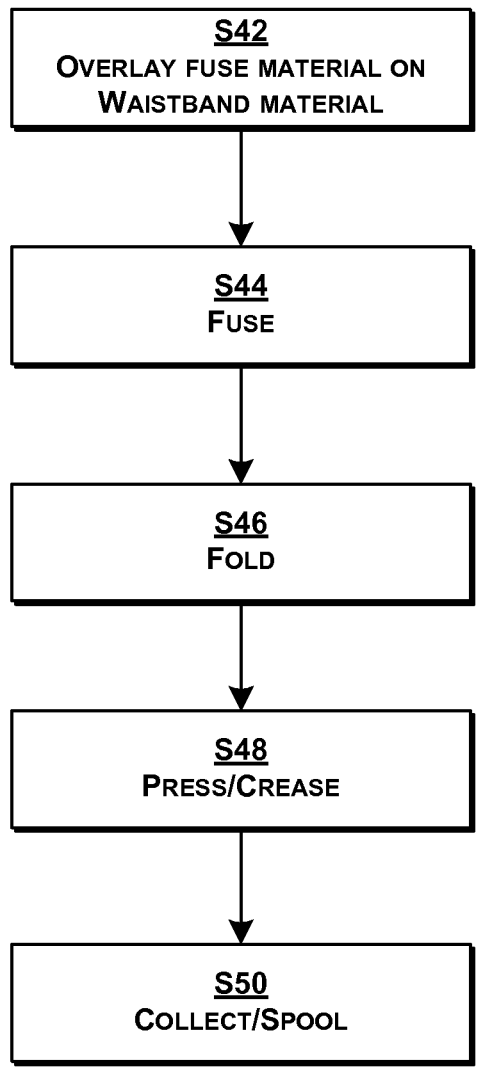
FIGS. 4A-4B are flowcharts of processes for manufacture of waistbands or collar stands according to embodiments hereof.

FIG. 4A is a flowchart of an exemplary process for manufacture of continuous waistbands or collar stands according to embodiments hereof, using, e.g., the system shown in FIG. 3A. As shown in FIG. 4A, the fusible substrate 12 (fuse material) is overlaid (at S42) onto the first substrate 10 (e.g., waistband material). This corresponds, e.g., to the merging of the two substrates 10 and 12 prior to entering the fuser 32 in FIG. 3A. The result of the overlay (in S42) is the fusible substrate 12 being positioned on top of the first substrate 10, e.g., as shown in FIGS. 1A and 2A.

Next, the two substrates 10 and 12 are fused (at S44). Using the exemplary system shown in FIG. 3A, the fusing (at S44) may be done by fuser (fusing press) 32, e.g., by being fused together under appropriate conditions (e.g., under appropriate pressure, speed, and temperature). The fused substrates (denoted 14 exiting fuser 32 in FIG. 3A) are then cooled (if needed—not shown in the flow chart) and then folded (at S46). In the exemplary system of FIG. 3A, the folding may be done by folder(s) 34 (e.g. the folder shown in FIGS. 6A-6N), and the result of the folding may correspond to the three-way folding described above with reference to FIGS. 1A to 1C and 2A to 2C. In some embodiments the folding may result in a one-fold waistband or a two-fold waistband.

Next, the folded substrates are pressed/creased (at S48). In the exemplary system of FIG. 3A, the pressing/creasing (in S48) may be done by press 36, e.g., by being pressed together under appropriate conditions (e.g., under appropriate pressure, speed, and temperature).

The fused three-way folded, pressed and creased substrates may then be collected and/or spooled (at S50).

In some preferred embodiments, the continuous tri-folded and pressed waistbands are rolled into 10 or 20 waistband lengths which may then be taken to a production floor where they are fitted overhead or under a waistband machine (that pull the bands as needed) as the operator attaches the waistband onto the pants. It should be appreciated that the use of a spool of continuous waistbands means that, in use, only the first waistband needs to be fed into the waistband machine, the rest of the waistband will follow as needed.

In some cases the waistbands being produced will include curtains or inners. In these case, as shown, e.g., in FIG. 3B, in addition to the first substrate 10 and the fusible substrate 12, the fuser 32" also takes in a second substrate 60 (for the curtain or inner) and a second fusible substrate 62. The output of the fuser 32" is first stream 14" formed from the first substrate 10 being fused/pressed with the first fusible 12, and a second stream 64 formed from the second substrate 60 being fused/pressed with the first fusible 62. These two streams are the allowed to cool, as needed, and then joined (by joiner 33) to form a combined stream 66 (with the curtain or inner joined to the combined first substrate 10 and fusible substrate 12. The combined stream 66 is then fed into folder 34", folded as required, and then the folded stream 68 is fed substantially directly into the mouth 38" of the press 36". The output 70 of the press 36" may then be collected and spooled (by spooler 40" on spool 42").

It should be understood that the joiner 33 may be a sewing machine or the like and may require human operation.

Figure 4B:
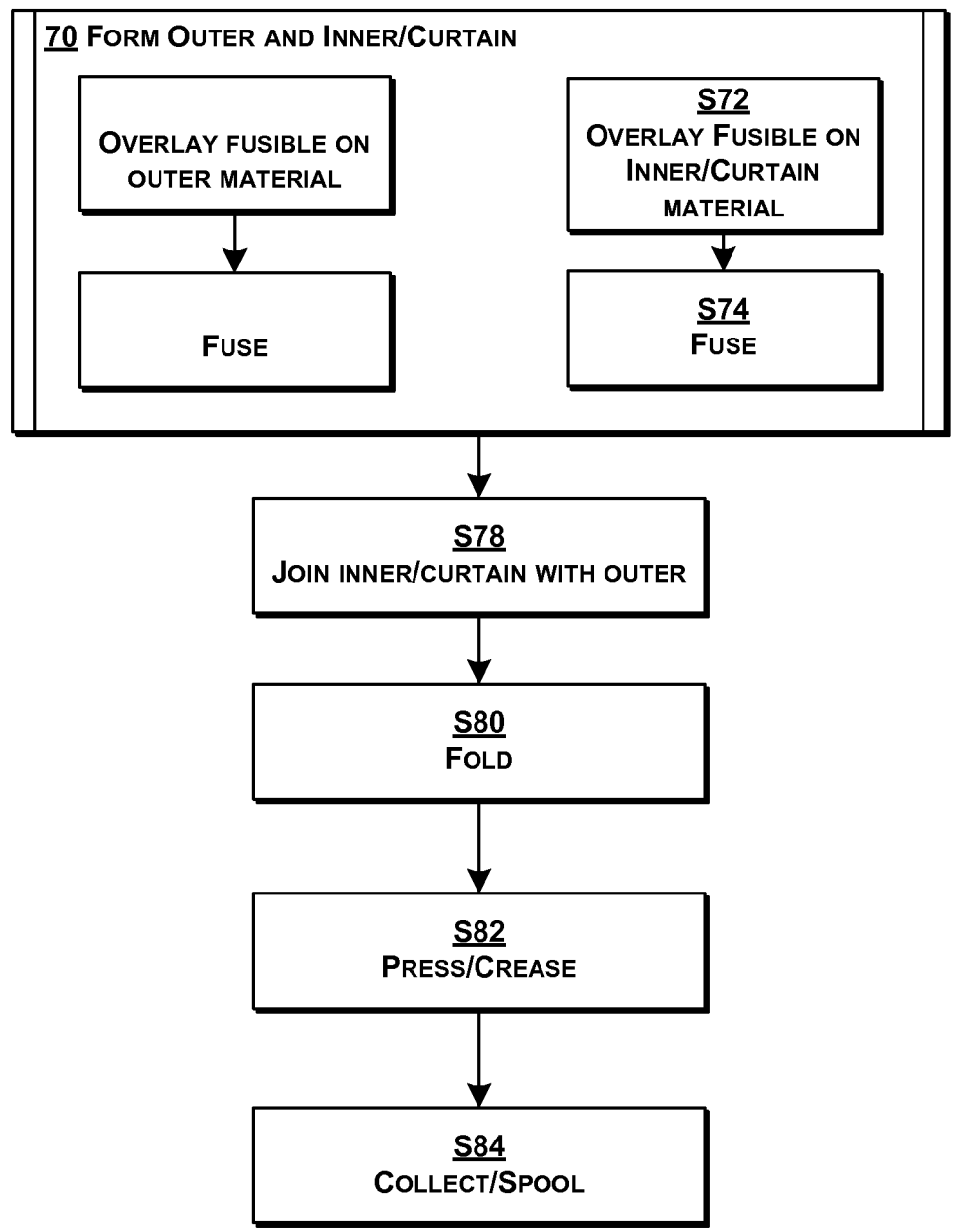

FIG. 4B is a flowchart of an exemplary process for manufacture of continuous waistbands or collar stands according to embodiments hereof, using, e.g., the system shown in FIG. 3B. First (at S70) and outer and an inner or curtain are formed. The outer (14" in FIG. 3B) is formed in the same manner as the combination 14 in FIG. 3A. The inner or curtain may be formed in a similar manner (at S72, S74). The outer 14" and inner or curtain 64 are then joined (at S78), folded (at S80), and pressed/creased (at S82). As noted, the folding (at S80) may result in one, two, three, or more folds. The combined folded, pressed outer and inner (or outer and curtain) may then be collected (e.g., spooled) (at S84).

Those of ordinary skill in the art will realize and appreciate, upon reading this description, that when a single substrate is used, without a fusible substrate, then the fuser 32 (FIG. 3A) may be omitted (as shown, e.g., in FIG. 3C). If a single substrate is used for the outer 10 in the embodiment of FIG. 3B, then that substrate need not be processed by fuser 32", and it may be fed directly into joiner 33 (as shown, e.g., in FIG. 3D).

Figure 5:
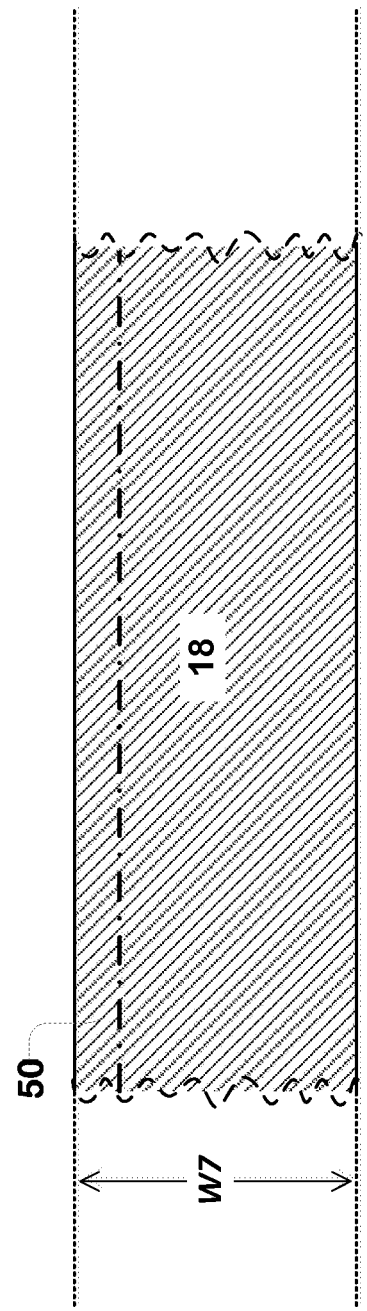
FIG. 5 is a top view of a waistband according to embodiments hereof.

FIG. 5 is a top view of a continuous waistband 18 according to embodiments hereof, produced by the system 30 and process(es) described above. The continuous waistband 14 shown in FIG. 5 may be further processed to include seams, e.g., seam 50, as seen, e.g., on some jeans.

The first substrate may be or comprise, without limitation, a material selected from the group comprising: denim, cotton (e.g., 100% cotton or cotton blends), wool (e.g. 100% wool or wool blends), polyester, polyester blends, spandex (elastane), spandex blend, polyester viscose (e.g., polyester and Rayon or some fabric made from regenerated cellulose fiber), linen or linen blends. A cotton blend may be, e.g., a 65/35 cotton polyester blend or a 50/50 cotton polyester blend. A polyester blend may be, e.g., a 98/2 polyester cotton blend or a 97/3 polyester cotton blend. Those of ordinary skill in the art will realize and appreciate, upon reading this description, that different and or other materials and blends may be used, and the examples of materials listed here are not intended to limit the scope of this invention in any way.

EXAMPLES

Example 1

In one example, the first substrate 10 is denim and the fusible substrate 12 is a 84 mm fusible substrate, and the fuser 32 is set to 180° C., speed at 5 Meters/Minute and pressure at 5 bars.

Example 2

In another example, the first substrate 10 is 100% cotton and the fusible substrate 12 is a 80 mm fusible substrate, and the fuser is set to 160° C., at 4 Meters/Minute with the pressure at 4 bars.

Example 3

In another example, the first substrate 10 is denim and the fusible substrate 12 is a 47 mm fusible substrate, and the fuser 32 is set to 180° C., speed at 5 Meters/Minute and pressure at 5 bars.

Example 4

In another example, the first substrate 10 is 100% wool and the fusible substrate 12 is a 45 mm fusible substrate, and the fuser 32 is set to 160° C., speed at 4 Meters/Minute and pressure at 4 bars.

Thus are described continuous folded waistbands and collar stands, and methods and system for making same.

Although some of the examples and processes shown about use fusible substrate, it should be appreciated that a fusible substrate is not required in all embodiments, and that waistbands and collar stands may be made without a fusible substrate.

In some embodiments the fabric for the waistband (or collar stand) may be or include spandex (sometimes referred to as "elastane," e.g., Lycra™ or some such material comprising an elastic polyurethane fiber or fabric) so that it will be able to stretch by itself.

In some embodiments the fabric used to make the waistband (or collar stand) may be cut on a bias in order to impart a degree of mechanical stretch to the fabric, with or without the use of a fusible.

The systems and processes described remove the complexities, inaccuracies and waste of manual products.

While the above example all show three-way folds, some waistband may only require one or two folds, and these may accommodated by different folders.

Where a process is described herein, those of ordinary skill in the art will appreciate that the process may operate without any user intervention. In another embodiment, the process includes some human intervention (e.g., a step is performed by or with the assistance of a human).

As used in this description, the term "portion" means some or all. So, for example, "A portion of X" may include some of "X" or all of "X". In the context of a conversation, the term "portion" means some or all of the conversation.

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

I claim:

1. A method for creating a continuous stream of elements of garments, the method comprising:
    (A) providing a continuous first substrate and a continuous fusible substrate;
    (B) positioning said continuous fusible substrate on said continuous first substrate to form a combination;
    (C) fusing said combination at a first temperature to form a first fused combination;
    (D) folding said first fused combination to form a folded fused combination; and
    (E) pressing said folded fused combination at a second temperature to form said continuous stream,
    wherein said continuous stream comprises multiple individual elements of multiple garments,
    wherein said second temperature is lower than said first temperature.

2. The method of claim 1 wherein said positioning in (B) positions said fusible substrate substantially along a central axis of said first substrate.

3. The method of claim 1 wherein said fusing in (C) comprises:
    pressing said combination with a fusing press under first heated conditions.

4. The method of claim 3 wherein said pressing in (E) comprises:
    pressing said folded fused combination with a press distinct from said fusing press, and under second heated conditions distinct from said first heated conditions.

5. The method of claim 1 wherein said folding in (D) comprises:
    (D)(1) forming three folds in said first fused combination.

6. The method of claim 5 wherein said three folds comprise:
    a first side fold,
    a second side fold, and
    a center fold.

7. The method of claim 5 wherein said three folds comprise:
    a first side fold formed by folding a first portion of said continuous first substrate over at least some of said continuous fusible substrate.

8. The method of claim 7 wherein said three folds also comprise:
    a second side fold formed by folding a second portion of said continuous first substrate over at least some of said continuous fusible substrate.

9. The method of claim 8 wherein said three folds also comprise:
    a middle fold formed by folding said first fused combination after said first side fold and said second side fold have been made.

10. The method of claim 1 wherein said first substrate comprises a first material selected from the group comprising: denim, cotton, cotton blends, wool, wool blends, polyester, polyester blends, spandex, spandex blends, polyester viscose, linen and linen blends.

11. The method of claim 1 wherein said fusible substrate comprises a second material selected from the group comprising:
84 mm fusible substrates, 45 mm fusible substrates, 47 mm fusible substrates, and 80 mm fusible substrates.

12. The method of claim 1 further comprising:
    (F) spooling portions of said continuous stream.

13. The method of claim 12 wherein said portions comprise sufficient continuous waistband stream for at least ten individual waistbands.

14. The method of claim 12 wherein said portions comprise sufficient continuous elements in said stream for at least twenty individual elements.

15. The method of claim 1 wherein said folding in (D) folds said first fused combination with a single folder.

16. The method of claim 1 wherein said first continuous substrate was formed by joining pre-cut elements together.

17. The method of claim 1 further comprising:
    (G) cutting a single element from said continuous elements.

18. The method of claim 1 wherein the elements of garments are waistbands.

19. The method of claim 1 wherein the elements of garments are collar stands.

20. A method for creating a continuous stream of elements of garments, the method comprising:
    (A) providing a continuous first substrate and a continuous first fusible substrate;
    (B) positioning said continuous first fusible substrate on said continuous first substrate to form a first fused combination;
    (C) fusing said first combination at a first temperature to form a first fused combination;
    (D) providing a continuous second substrate;
    (E) joining said first fused combination with at least said continuous second substrate to form a joined combination;
    (F) folding said joined combination to form a folded joined combination; and
    (G) pressing said folded joined combination at a second temperature to form said continuous stream,
    wherein said continuous stream comprises multiple individual elements of multiple garments, and
    wherein said second temperature is a lower than said first temperature.

21. The method of claim 20 further comprising:
    (D)(1) providing a continuous second fusible substrate;
    (D)(2) positioning said continuous second fusible substrate on said continuous second substrate; and, prior to said joining in (E),
    (D)(3) fusing said continuous second fusible substrate with said continuous second substrate.

22. The method of claim 21 wherein said joining in (E) joins said first fused combination with said continuous second substrate fused to form said joined combination.

23. The method of claim 20 wherein the fusing in (C) is done with a heated fusing press.

24. The method of claim 23 wherein the pressing in (G) is done with a heated press.

25. The method of claim 20 wherein said folding in (F) comprises:
    (F)(1) forming three folds in said joined combination.

26. The method of claim 25 wherein said three folds comprise:
    a first side fold,
    a second side fold, and
    a center fold.

27. The method of claim 25 wherein the folds are formed simultaneously.

28. The method of claim 25 wherein said three folds comprise:

a first side fold formed by folding a first side portion of said joined combination over at least some of said joined combination.

29. The method of claim 28 wherein said three folds also comprise:
a second side fold formed by folding a second side portion distinct from the first side portion of said joined combination over at least some of said joined combination.

30. The method of claim 29 wherein said three folds also comprise:
a middle fold formed by folding said joined combination after said first side fold and said second side fold have been made.

31. The method of claim 20 wherein said first substrate comprises a first material selected from the group comprising: denim, cotton, cotton blends, wool, wool blends, polyester, polyester blends, spandex, spandex blends, polyester viscose, linen and linen blends.

32. The method of claim 20 wherein said first fusible substrate comprises a second material selected from the group comprising: 84 mm fusible substrates, 45 mm fusible substrates, 47 mm fusible substrates, and 80 mm fusible substrates.

33. The method of claim 20 wherein said second substrate comprises a third material selected from the group comprising: denim, cotton, cotton blends, wool, wool blends, polyester, polyester blends, spandex, spandex blends, polyester viscose, linen and linen blends.

34. The method of claim 20 wherein the elements of garments are selected from: waistbands and collar stands.

35. The method of claim 20 further comprising:
(H) spooling portions of said continuous stream.

36. The method of claim 35 further comprising:
(J) spooling portions of said continuous stream.

37. A method for creating a continuous stream of elements of garments, the method comprising:
(A) providing a continuous first substrate and a continuous first fusible substrate;
(B) positioning said continuous first fusible substrate on said continuous first substrate to form a first combination;
(C) fusing said first combination to form a first fused combination;
(D) providing a continuous second substrate and a continuous second fusible substrate;
(E) positioning said continuous second fusible substrate on said continuous second substrate to form a second combination;
(F) fusing said second combination to form a second fused combination;
(G) joining said first fused combination with said second fused combination to form a joined combination;
(H) folding said joined combination to form a folded joined combination; and
(I) pressing said folded joined combination to form said continuous stream,
wherein said fusing in (C) and said fusing in (F) are performed at a first temperature, and
wherein said pressing in (I) is performed at a second temperature, and
wherein said second temperature is lower than said first temperature, and
wherein said continuous stream comprises multiple individual elements of multiple garments.

38. The method of claim 37 wherein said fusing in (C) and said fusing in (F) use a fuser heated to said first temperature.

39. The method of claim 37 wherein said folding in (H) comprises:
(H)(1) forming three folds in said joined combination.

40. The method of claim 39 wherein said three folds comprise:
a first side fold,
a second side fold, and
a center fold.

41. The method of claim 40 wherein the three folds are formed simultaneously.

42. The method of claim 40 wherein said three folds comprise:
a first side fold formed by folding a first side portion of said joined combination over at least some of said joined combination.

43. The method of claim 42 wherein said three folds also comprise:
a second side fold formed by folding a second side portion distinct from the first side portion of said joined combination over at least some of said joined combination.

44. The method of claim 43 wherein said three folds also comprise:
a middle fold formed by folding said joined combination after said first side fold and said second side fold have been made.

45. The method of claim 37 wherein said first substrate comprises a first material selected from the group comprising: denim, cotton, cotton blends, wool, wool blends, polyester, polyester blends, spandex, spandex blends, polyester viscose, linen and linen blends.

46. The method of claim 37 wherein said first fusible substrate comprises a second material selected from the group comprising: 84 mm fusible substrates, 45 mm fusible substrates, 47 mm fusible substrates, and 80 mm fusible substrates.

47. The method of claim 37 wherein said second substrate comprises a third material selected from the group comprising: denim, cotton, cotton blends, wool, wool blends, polyester, polyester blends, spandex, spandex blends, polyester viscose, linen and linen blends.

48. The method of claim 37 wherein said second fusible substrate comprises a fourth material selected from the group comprising: 84 mm fusible substrates, 45 mm fusible substrates, 47 mm fusible substrates, and 80 mm fusible substrates.

49. The method of claim 37 wherein the elements of garments are selected from: waistbands and collar stands.

* * * * *